US009369278B2

(12) United States Patent
Kawarasaki et al.

(10) Patent No.: US 9,369,278 B2
(45) Date of Patent: Jun. 14, 2016

(54) METHOD FOR MAINTENANCE OR EXCHANGE OF ENCRYPTION FUNCTION IN STORAGE SYSTEM AND STORAGE DEVICE

(71) Applicant: HITACHI, LTD., Tokyo (JP)

(72) Inventors: Masahide Kawarasaki, Tokyo (JP); Tetsuya Shirogane, Tokyo (JP); Shinichi Nakayama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 187 days.

(21) Appl. No.: 14/241,757

(22) PCT Filed: Mar. 22, 2013

(86) PCT No.: PCT/JP2013/058388
§ 371 (c)(1),
(2) Date: Feb. 27, 2014

(87) PCT Pub. No.: WO2014/147836
PCT Pub. Date: Sep. 25, 2014

(65) Prior Publication Data
US 2016/0080148 A1    Mar. 17, 2016

(51) Int. Cl.
*G06F 21/00*  (2013.01)
*H04L 9/08*  (2006.01)
*G06F 21/78*  (2013.01)
*G06F 12/14*  (2006.01)

(52) U.S. Cl.
CPC .......... *H04L 9/0891* (2013.01); *G06F 12/1408* (2013.01); *G06F 21/78* (2013.01)

(58) Field of Classification Search
CPC .... H04L 9/0891; G06F 21/78; G06F 12/1408
See application file for complete search history.

(56) References Cited

U.S. PATENT DOCUMENTS

| 8,098,824 B2* | 1/2012 | Mikami | G06F 11/2074 380/277 |
| 8,259,951 B2* | 9/2012 | Mizuno | H04L 9/0833 380/278 |
| 2005/0204154 A1 | 9/2005 | Osaki | |
| 2007/0136606 A1 | 6/2007 | Mizuno | |

(Continued)

FOREIGN PATENT DOCUMENTS

| JP | 2005-109641 A | 4/2005 |
| JP | 2005-303981 A | 10/2005 |

(Continued)

OTHER PUBLICATIONS

"Self-Encrypting Drives for Servers, NAS and SAN Arrays," White Paper, Nov. 4, 2009, pp. 1-15.*

(Continued)

*Primary Examiner* — Michael Pyzocha
(74) *Attorney, Agent, or Firm* — Mattingly & Malur, PC

(57) ABSTRACT

In order to quickly perform maintenance or exchange of a controller of a storage device having an encryption function in a storage system, a first controller in a Ready state spoofs a second controller subjected to maintenance or exchange to acquire key information from a key management server and to store the information in a memory, and a second controller reads the key information from the memory of the first controller to store the information in an own memory to convert the second controller into a Ready state. Then, the first controller deletes acquired key information from an own memory to convert the controller into a Halt state.

10 Claims, 4 Drawing Sheets

(56) References Cited

U.S. PATENT DOCUMENTS

| | | | | |
|---|---|---|---|---|
| 2007/0165440 | A1* | 7/2007 | Hirai | H04L 9/3273 365/63 |
| 2009/0307499 | A1* | 12/2009 | Senda | H04L 9/0861 713/187 |
| 2010/0119069 | A1 | 5/2010 | Kamikura et al. | |
| 2010/0306555 | A1 | 12/2010 | Sasahara et al. | |
| 2011/0191595 | A1* | 8/2011 | Damian | H04L 9/06 713/189 |
| 2013/0208892 | A1* | 8/2013 | Moriguchi | G06F 21/805 380/277 |
| 2015/0271161 | A1* | 9/2015 | Katsuta | H04L 63/06 713/171 |

FOREIGN PATENT DOCUMENTS

| | | |
|---|---|---|
| JP | 2007-157049 A | 6/2007 |
| JP | 2010-277427 A | 12/2010 |
| WO | 01/69842 A1 | 9/2001 |
| WO | 2008/146395 A1 | 12/2008 |

OTHER PUBLICATIONS

"Dell PowerVault™ MD32/MD36 Series of Arrays Overview of Self-Encrypting Drive Management on Dell PowerVault Storage Arrays," White Paper, Jun. 2011, pp. 1-16.*

Kitano et al., "Open System Disk Array GR720/GR730 corresponding to the Network Computing Time" PFU. Technical Review, Nov. 1, 2000, vol. 11, No. 2, pp. 1-10.

* cited by examiner

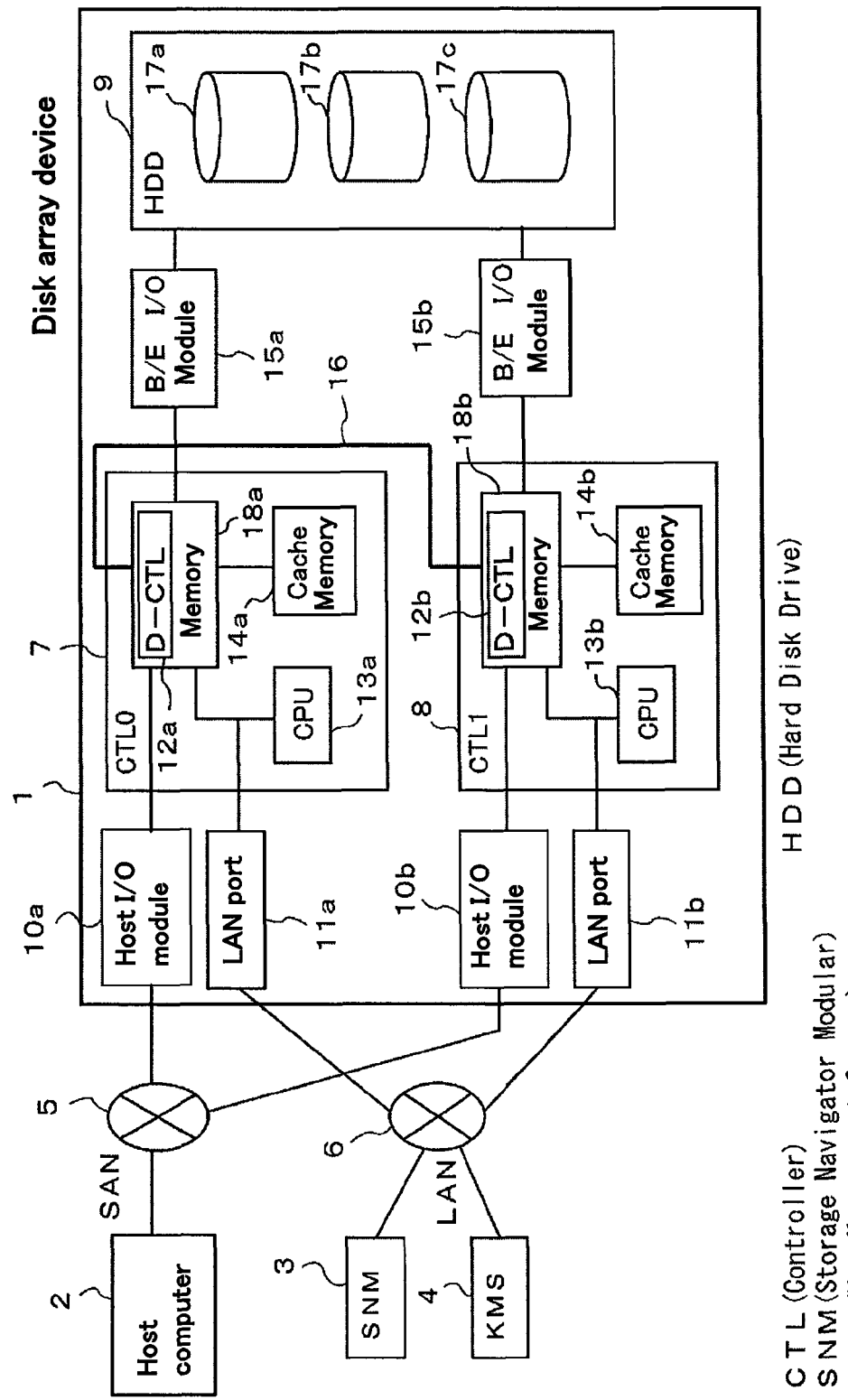

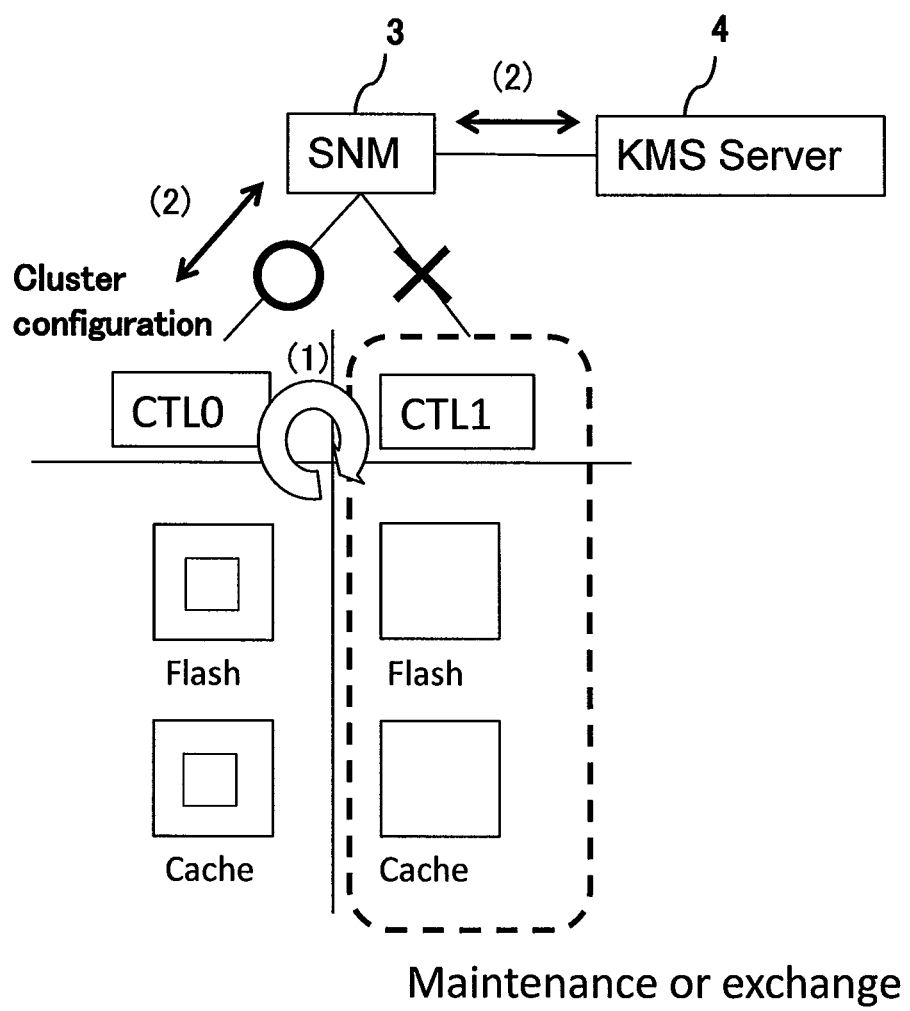

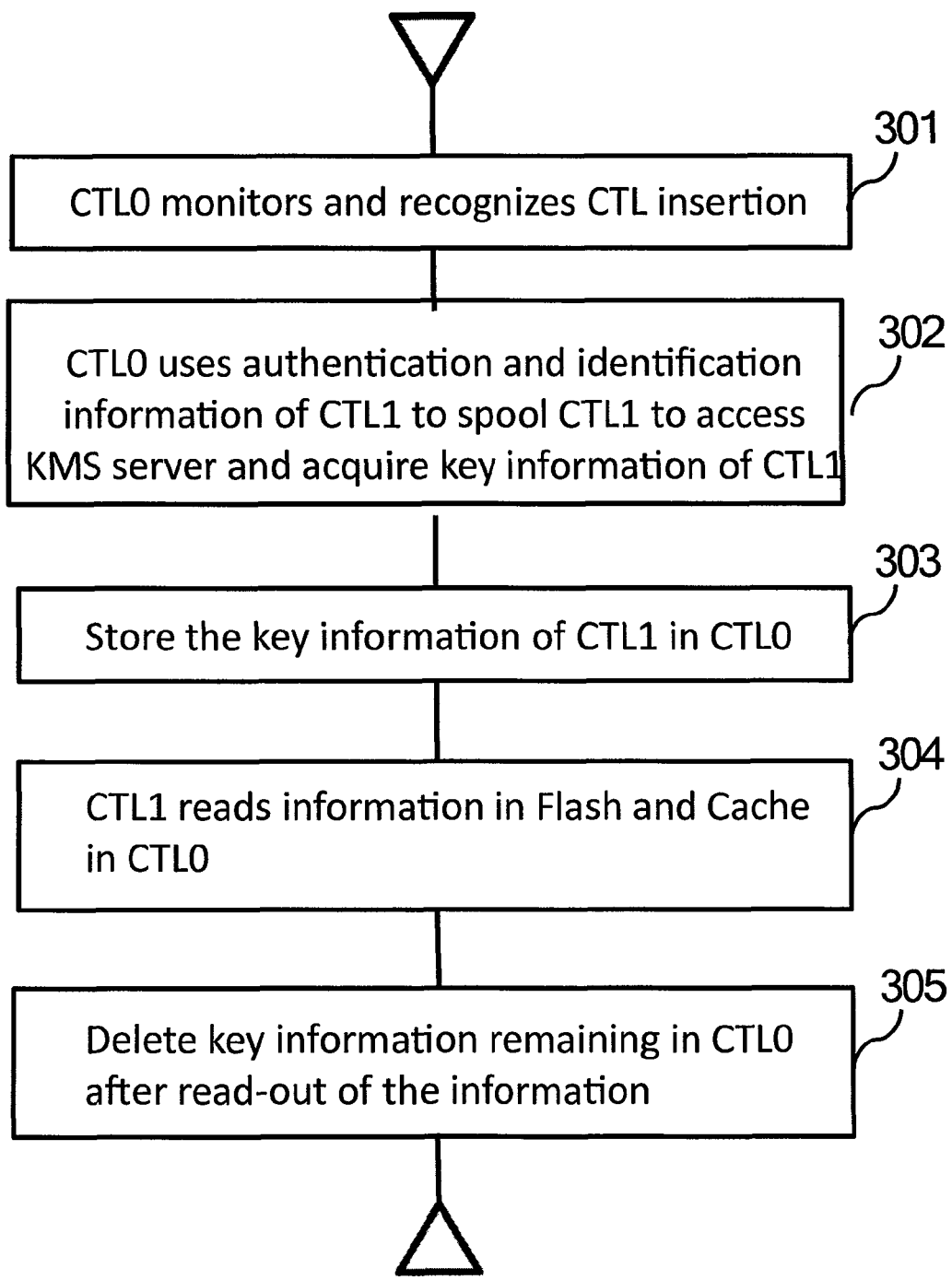

METHOD FOR MAINTENANCE OR EXCHANGE OF ENCRYPTION FUNCTION IN STORAGE SYSTEM AND STORAGE DEVICE

TECHNICAL FIELD

The present invention relates to a method for maintenance or exchange of an encryption function in a storage system using a key management server, in particular, to a method for acquiring key information upon maintenance or exchange of a controller.

BACKGROUND ART

A technology exists for encrypting data with an encryption key in an HDD (Hard Disk Drive) inside a storage device of a storage system to improve security (Patent Literature 1). A technology also exists for encrypting data, and upon storing the data over a long period of time, exchanging stored encrypted data on the basis of a new set of encryption standards (Patent Literature 2). Further, a technology exists for generating and managing an encryption key using a key management server different from a storage device in order to improve security in consideration of theft of an HDD or the like (Patent Literature 3).

In the case where the encryption key is generated and managed using the key management server different from the storage device as disclosed in Patent Literature 3, the storage device per se does not generate the key. Therefore, in the case where maintenance or exchange of a controller is performed when a fault is caused in the controller in the storage device, a newly exchanged controller or a spare controller does not have an encryption key, and therefore necessity of deriving a key from the key management server (KMS server) is caused. Thus, a method can be considered for acquiring key information from an exchanged controller by LAN communication to the key management server. However, the key information is acquired after the exchanged controller comes into a ready state, and therefore a problem of taking time for starting up of the exchanged controller is produced.

CITATION LIST

Patent Literature

PTL 1: JP-A-2005-109641.
PTL 2: JP-A-2005-303981.
PTL 3: JP-A-2010-277427.

SUMMARY OF INVENTION

Technical Problem

In general, in the case where maintenance or exchange of a controller (CTL) is executed in a storage system in which a function of encrypting stored data is used, maintenance or exchange is conventionally performed by procedures as described below. More specifically, according to a configuration in which a controller (CTL0) before exchange to which I/O module A (a module performing I/O processing on a back-end side) is connected to a KMS server by LAN communication A, and an exchanged controller (CTL1) to which I/O module B is connected to the KMS server by LAN communication B, the following procedures are required in order to complete starting up of CTL1:

(1) Securing LAN communication;
(2) Acquiring key information by demanding the information from the KMS server;
(3) Acquiring the key information to start up I/O module B (the key information is required for starting up the I/O module); and
(4) Starting up I/O module B to convert CTL1 into a ready state.

In (1) described above, LAN communication B cannot perform communication with the KMS server in Patent Literature 3. When an encryption function is not used for stored data, the I/O module can be started up from information in a Flash memory in the controller. However, when the encryption function is used for the stored data, the communication with the KMS server is not ready, and therefore a function for encryption communication cannot be used from the information in the Flash memory. Therefore, the key information cannot be demanded from the KMS server, and thus starting up of CTL cannot be made. Even if an information area of the Flash memory is extended to allow correspondence to the function for encryption communication, a period of time needed from initial start-up to establishment of LAN communication is long, and time is required to reach a Ready state (a state in which I/O can be processed between a host computer and a disk).

Solution to Problems

Controllers in a storage system to which the present invention is applied has a dual configuration, and one is a new controller or a spare controller to be maintained or exchanged, and the other is a controller in a Ready state, and holds key information.

Consequently, according to the present invention, in order to solve the problems described above, the controller (CTL0) in the Ready state spoofs a controller (CTL1) subjected to maintenance or exchange, acquires key information from a key management server, and transfers the information to the controller subjected to maintenance or exchange and to convert the controller into the Ready state. In addition, CEK (Contents Encryption Key)/DEK (Data Encryption Key) being the key information is inherent to each controller.

In the present invention, action of "spoof" as described above is performed as described below.

CTL0 uses information on authentication and identification of CTL1, accesses the key management server (KMS server), and acquires the key information. Next, CTL0 stores the key information of CTL1 as acquired from the KMS server in a Flash memory and a Cache memory. Finally, CTL1 reads the key information from the Flash memory and the Cache memory of CTL0, and writes the information in an own Flash memory and an own Cache memory.

Further, CTL0 deletes the key information of CTL1 that remains in the own Flash memory and the own Cache memory.

Advantageous Effects of Invention

According to the present invention, a controller in a Ready state spoofs a controller subjected to maintenance or exchange upon maintenance or exchange of an encryption function in a storage system, and acquires key information, and therefore the controller subjected to maintenance or exchange can be quickly started up.

BRIEF DESCRIPTION OF DRAWINGS

FIG. 1 is a drawing showing a configuration of a storage system in the present Example.

FIG. 2A is a drawing showing an outline of processing of maintenance or exchange of an encryption function.

FIG. 3 is a diagram showing a flow of processing of maintenance or exchange of an encryption function.

DESCRIPTION OF EMBODIMENTS (System Configuration)

Figure 2B:
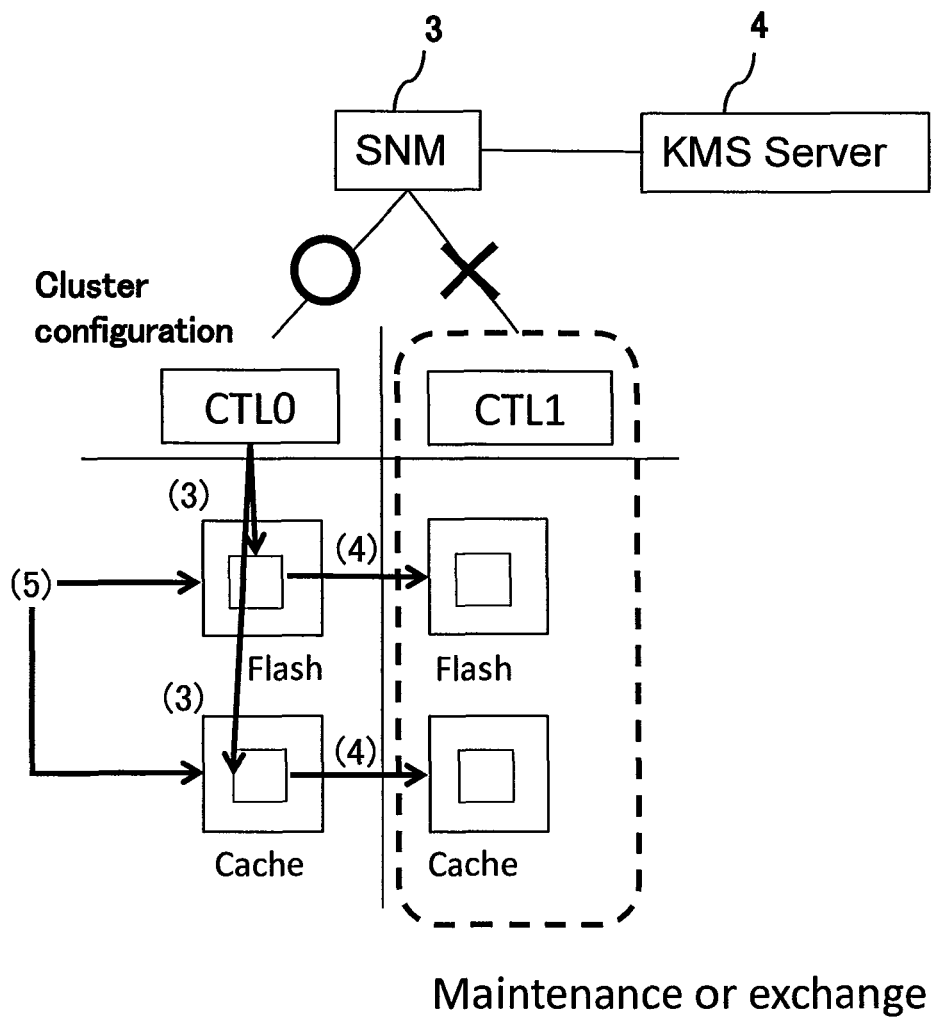
FIG. 2B is a diagram showing an outline of processing of maintenance or exchange of an encryption function.

A configuration of a storage system in the present Example is shown in FIG. 1. Disk array device 1 (storage device) that writes and reads data to and from a disk array constituted of a plurality of disks is connected to host computer 2 through SAN (Storage Area Network) 5, and further connected to SNM (Storage Navigator Modular) 3 and KMS (Key Management Server) 4 through LAN (Local Area Network) 6. SNM 3 is storage management software for performing integrated management of network infrastructure, and KMS 4 is a server for managing a key for accessing one of the disks.

In disk array device 1, two lines of controllers, namely, CTL0 (7) and CTL1 (8) are arranged for HDD (Hard Disk Drive) 9 that configures a disk array constituted of a plurality of disks 17a to 17c for storing encrypted data, and the controllers 7 and 8 are connected with HDD 9 by B/E I/O modules 15a and 15b each being a back-end module, respectively. B/E I/O modules 15a and 15b have an encryption communication device being hardware for controlling transfer of encrypted data between each of controllers 7 and 8 and HDD 9, and a DEK (Data Encryption Key) list required for data encryption or decryption. Moreover, the controllers 7 and 8 are connected to SAN 5 through host I/O modules 10a and 10b, respectively, and connected to LAN 6 through LAN ports 11a and 11b, respectively.

Controller CTL0 (7) has memory 18a, and D-CTL 12a being a microprogram in memory 18a, and D-CTL 12a has an encryption function for encrypting or decrypting data, and simultaneously confirms whether HDD 17 performing I/O is RG (RAID Group) or DP (Dynamic Provisioning) Pool for designating encryption. To memory 18a having D-CTL 12a, CPU 13a and Cache memory 14a are connected, and memory 18a is further connected to host I/O module 10a and LAN port 11a, and B/E I/O module 15a. D-CTL 12a in memory 18a is executed by CPU 13a. Controller CTL1 (8) also has a similar configuration. Two lines of controllers CTL0 (7) and CTL1 (8) are connected by control line 16 for mutual information exchange or the like.

One of two lines of controllers CTL0 (7) and CTL1 (8) is a new controller to be maintained or exchanged, or a spare controller, and the other holds the key information and is in a Ready state (a state in which I/O can be processed between a host computer and a disk). Consequently, according to the present Example, controller 7 (CTL0) in the Ready state spoofs controller 8 (CTL1) subjected to maintenance or exchange, acquires the key information from the key management server (KMS 4), transfers the information to controller 8 subjected to maintenance or exchange, and converts controller 8 subjected to maintenance or exchange into the Ready state. As a result, maintenance or exchange from controller 7 to controller 8 is completed. The key information acquired by the controller from the key management server (KMS 4) is stored in memory 18a. In addition, when a controller deletes the key information, the controller is in a Halt state (a state in which I/O control is not performed or cannot be performed).

(Processing Flow)

The outline of maintenance or exchange processing of a controller in the present Example is described using FIG. 2A, FIG. 2B and FIG. 3. A number in a parenthesis shown in FIG. 2A and FIG. 2B corresponds to a number of a processing procedure as described below. Processing (2) and (3) as described below are a part in which CTL0 spoofs CTL1 to perform action. A program for executing processing shown in FIG. 3 is stored in controllers 7 and 8.

(1) CTL0 performing control of transceiving data between host computer 2 and HDD 9 monitors to detect existence of CTL1 for maintenance or exchange in disk array device 1 (301).

(2) CTL0 accesses a key management server (KMS 4) to acquire key information (302). Methods for acquiring a key have two patterns. Pattern 1: CTL0 per se recognizes that CTL1 is inserted, and instructs SNM 3 to acquire key information from CTL0. SNM 3 accesses the key management server (KMS 4) to acquire key information. Pattern 2: On a console of SNM 3, a user issues an instruction for acquiring key information.

(3) CTL0 stores in an own Flash memory and an own Cache memory 14a the key information of CTL1 acquired from KMS 4. A notice of completing storage of the key information is transmitted from CTL0 to CTL1 through control line 16. Although the Flash memory is not shown, controllers 7 and 8 are assumed to have the Flash memory built-in. The Flash memory is used for control of controllers 7 and 8 per se, and Cache memories 14a and 14b are used for control of transceiving data between host computer 2 and HDD 9 (303).

(4) If CTL1 receives the notice of completing storage of key information from CTL0, CTL1 reads the key information from the Flash memory and the Cache memory 14a of CTL0, and writes the information in the own Flash memory and the own Cache memory 14b. As a result, CTL1 comes into a Ready state (304). A notice of completing read-out of the key information is transmitted from CTL1 to CTL0 through control line 16.

(5) Any information cannot be left in any other system from a security issue, and therefore if CTL0 receives the notice of completing read-out of the key information from CTL1, CTL0 deletes the key information of CTL0 that remains in the own Flash memory and the own Cache memory 14a (305). As a result, CTL0 comes into a Halt state. The above-described security issue refers to possibility of occurrence of status described below. More specifically, if any information remains in any other system, the information may be used, for example, for I/O between the host computer and the disk through an unauthorized access route different from an authorized access route.

Even while the above-described maintenance or exchange processing is performed, the control of transceiving data between host computer 2 and HDD 9 is performed as described below. More specifically, the control of transceiving data and above-described maintenance or exchange processing is first performed in CTL0 (CTL0 performs the control of transceiving data in behalf of CTL1 in the meantime) and CTL1 comes into the Ready state, and then the control of transceiving data is performed in CTL0 and CTL1 until the Ready state of CTL0 is canceled. As a result, the control of transceiving data is not interrupted even during maintenance or exchange processing of the controller. If a controller comes into a Halt state, the controller does not allow I/O processing between the host computer and the disk.

REFERENCE SIGNS LIST

1: Disk array device, 2: Host computer, 3: SNM, 4: KMS, 5: SAN, 6: LAN, 7, 8: Controller (CTL), 9: HDD, 10: Host I/O module, 11: LAN port, 12: D-CTL, 13: CPU, 14: Cache memory, 15: B/E I/O module, 16: Control line, 17: Disk, 18: Memory

The invention claimed is:

1. A storage device connected to a host computer, comprising:
    a disk drive device constituted of a plurality of disks for storing encrypted data,
    a first controller for performing control of transceiving data between the first controller and the host computer, and
    a second controller for maintenance or exchange for performing control of transceiving data between the second controller and the host computer,
    wherein
    the first controller has a means for using information on authentication and identification of the second controller as acquired from a managing server to access a key management server and to acquire key information, and
    a means for storing in a memory the key information of the second controller as acquired from the key management server, and
    the second controller has a means for reading the key information from the memory of the first controller to write the information in a memory, and
    a means for setting the second controller per se in a Ready state.

2. The storage device according to claim 1,
    wherein the first controller has a means for detecting existence of the second controller in the storage device.

3. The storage device according to claim 1,
    wherein the first controller has a means for deleting the key information from the memory upon completion of writing to a memory the key information in the second controller.

4. The storage device according to claim 1,
    wherein the first controller has a means for transmitting to the second controller a notice of completion of storage of the key information in a memory, and
    the second controller has a means for transmitting to the first controller a notice of completion of storage of the key information in a memory.

5. The storage device according to claim 1,
    wherein the first controller performs control of transceiving data between the host computer and the disk drive device, and processing of acquisition of the key information, and after the second controller comes into a Ready state in which the control of transceiving data is allowed, the first controller and the second controller perform the control of transceiving data until the first controller comes into a Halt state.

6. A method for maintenance or exchange of an encryption function in a storage system comprising a storage device having a disk drive device constituted of a plurality of disks storing encrypted data, a first controller for performing control of transceiving data between the first controller and a host computer, and a second controller for maintenance or exchange for performing control of transceiving data between the second controller and the host computer,
    wherein the first controller uses information on authentication and identification of the second controller as acquired from a managing server to access a key management server and to acquire key information, and stores in a memory the key information of the second controller as acquired from the key management server,
    and the second controller reads the key information from the memory of the first controller to write the information in a memory, and sets the second controller per se to a Ready state.

7. The method for maintenance or exchange of the encryption function in the storage system according to claim 6,
    wherein the first controller detects existence of the second controller in the storage device before acquisition of the key information.

8. The method for maintenance or exchange of the encryption function in the storage system according to claim 6,
    wherein the first controller has a means for deleting the key information from the memory upon completion of writing the key information in a memory in the second controller.

9. The method for maintenance or exchange of the encryption function in the storage system according to claim 6,
    wherein the first controller transmits to the second controller a notice of completion of storage of the key information in a memory upon completion of storage of the key information in the memory, and
    the second controller transmits to the first controller a notice of completion of storage of the key information in a memory upon completion of storage of the key information in the memory.

10. The method for maintenance or exchange of the encryption function in the storage system according to claim 6,
    wherein the first controller performs control of transceiving data between the host computer and the disk drive device, and processing of acquisition of the key information, and after the second controller comes into a Ready state, the first controller and the second controller perform the control of transceiving data until the first controller comes into a Halt state.

* * * * *